July 2, 1963    D. W. PENDLETON ET AL    3,096,516
TRANSPARENT ELECTRONIC DISPLAY SYSTEMS
Filed April 12, 1960    3 Sheets-Sheet 1

*INVENTORS*
DAVID W. PENDLETON
BY    MAX SUSSMAN

Alexander & Dowell
*ATTORNEYS*

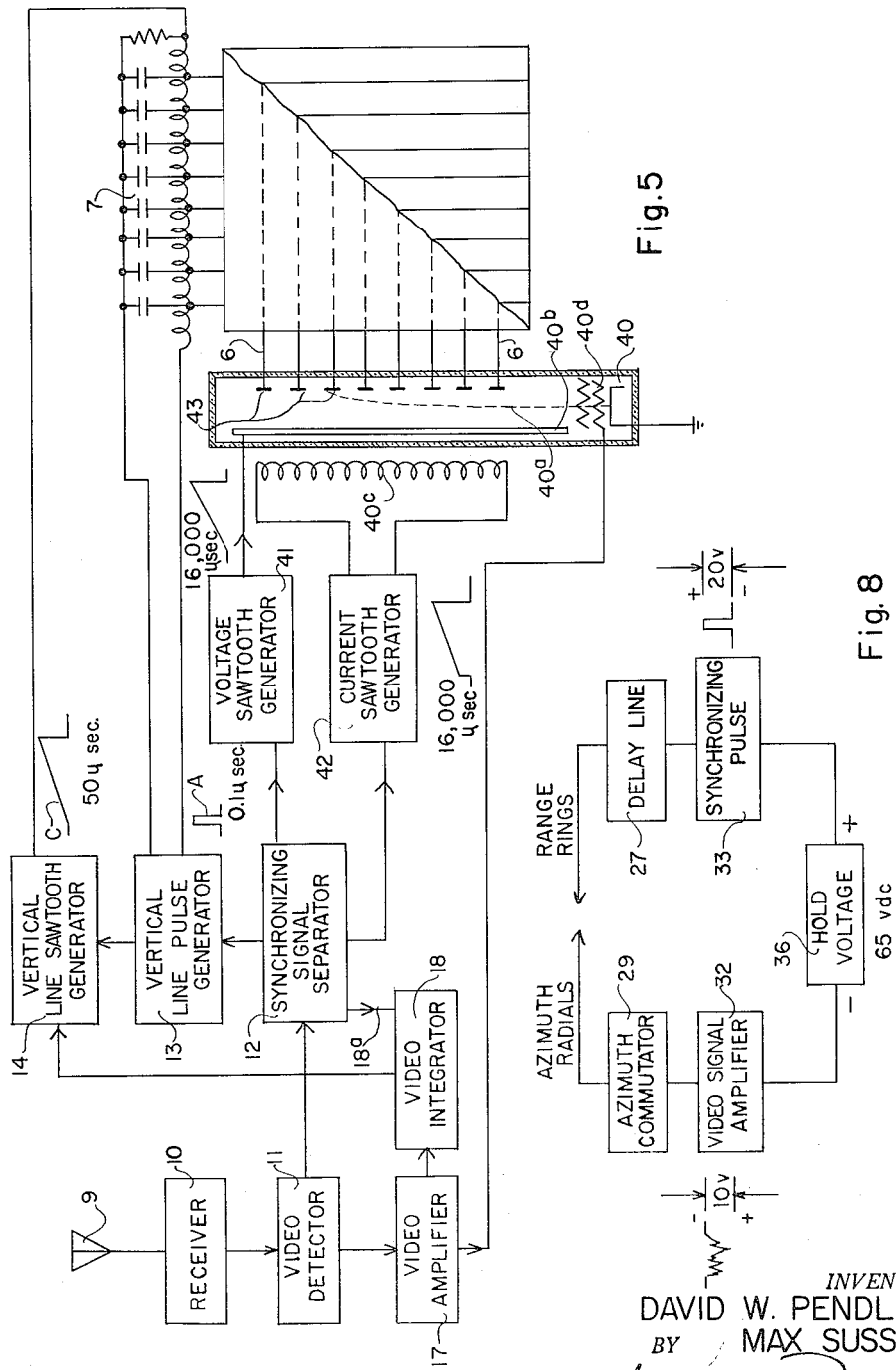

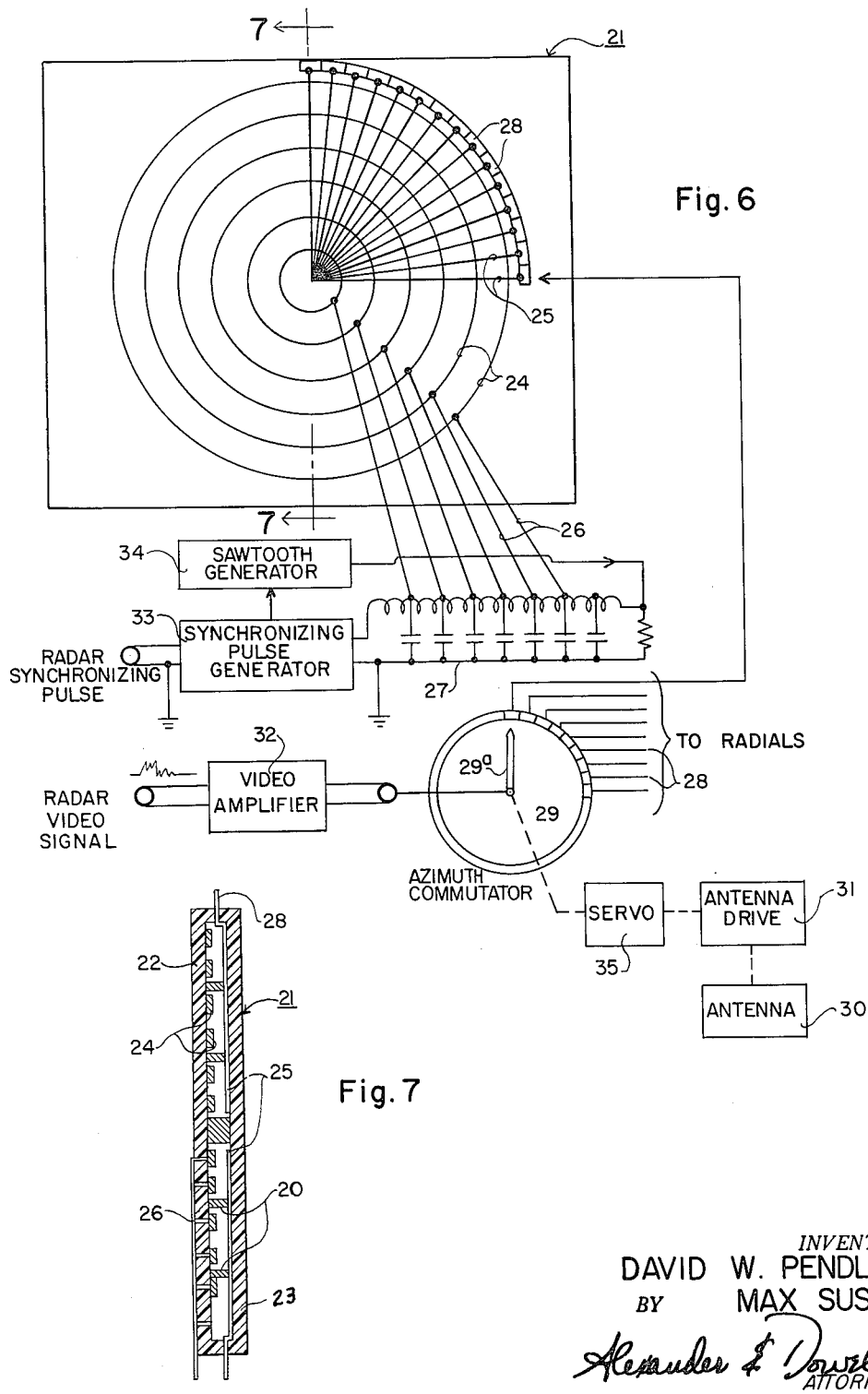

3,096,516
TRANSPARENT ELECTRONIC DISPLAY SYSTEMS
David W. Pendleton, 116 Woodley Drive, Alexandria, Va., and Max Sussman, 4649 Brummel St., Skokie, Ill.
Filed Apr. 12, 1960, Ser. No. 21,823
18 Claims. (Cl. 343—11)

This invention relates to a novel switching arrangement for a television viewing screen and is a continuation-in-part of an application for patent entitled "Transparent Electronic Display," Serial 575,609, filed April 2, 1956, now abandoned.

Although many methods of constructing a flat plate display have been proposed, a truly practical system for electrically driving or triggering the display has not been available. Mechanical methods are far too slow and cumbersome for many purposes, and electrical means in the past have been much too complex and expensive to be practical.

It is the object of this invention, therefore, to provide a practical and novel system of electronic display for television, radar, sonar, and other types of data wherein the screen is transparent, flat faced and of thin cross-section.

A further object is to provide a display system that can be used for displaying moving images, wherein the presentation can be "frozen" and preserved unchanged for an unlimited time, and wherein a cumulative history of movement can be displayed, as for instance to show the path followed by an aircraft as it passed through the area searched by the radar.

Other advantages include: Elimination of the cathode ray tube bottle; an internal structure that allows use of thin glass plates; the spot glow can be maintained or erased electrically rather than by dependence on phosphor persistence and heat; operating voltages of about 100 volts can be used rather than 10 or 20 kilovolts; the polar configuration can be used without necessity of complex sweep generators; multiple color plots can be superimposed without register problems; and the sweep linearity is built into the system permanently.

According to the present invention, there may be provided two, or more, transparent plates comprising a matrix having a multiplicity of conducting means oriented in any desired configuration and of as many lines as desired. The electrical conducting means are disposed in grooves or applied on the inner surfaces of the plates in strips. The plates are sealed together, evacuated and filled with an inert gas such as helium, neon, argon, xenon, or krypton to produce various desired colors. Any solid or liquid that can produce a glow or other illumination on application of a voltage may alternatively be inserted between the plates. Also, a cellular grid of insulating material may be inserted to ensure the integrity of non-conduction between conductor cross-points provided by any suitable arrangement, such as rectangular or polar coordinate crossed-conductors separated by said inert gas or other illumination media. Voltage pulses applied sequentially to one coodinate line structure and pulses of different rate and duration and of opposite polarity applied to the other line structure provide a bias voltage just below the ionization potential of the gas and moving along the conductor cross-points successively. When the present invention is used in connection with television, this impressed voltage should be a threshold voltage not quite sufficient to cause the display to glow. The video signals are then applied simultaneously to the conductors in additive relation, and the sub-threshold bias voltage and the voltages of the video signals are added so that there will be an ionized glow at these points at which the video signal is of sufficient strength to exceed the threshold.

The method of application of the bias pulses to the crossed-conductors is of great importance. According to the present invention, delay lines of the lumped-constant type are used at least in part for this purpose. The use of such delay lines results in many advantages over purely mechanical systems. Heretofore, mechanical means and extensive electrical circuitry have been used for this purpose, but limitations as to the speeds of operation of such mechanical means, and as to the accuracy of the prior electrical means have necessarily eliminated or greatly reduced the value of these systems in connection with television applications where the pulse sequence must be applied to all of the vertical and horizontal conducting elements within a matter of microseconds.

As stated above, the present invention employs at least one delay line, terminated in a resistance and comprising lumped inductances and capacities tapped for each matrix conductor in the coordinate structure to which it is connected. However, when a pulse is introduced into the delay, it is attenuated as it travels from tap to tap so that the pulse applied by the delay line to the last matrix conductor is of much smaller amplitude than the pulses applied to the first matrix conductor. Prior art systems attempting to use delay lines to bias the coordinate conductors have been thwarted by this attenuation.

It is a major object of this invention to provide means for compensating the delay line circuit for this attenuation so that the sub-threshold bias potential successively applied to the cross-points of the conductors is of constant peak amplitude regardless of the positions along the delay lines at which the various conductors are tapped thereinto to receive the bias pulses. For this purpose, the invention teaches the application of a substantially sawtooth wave form across the terminated end of each delay line to serve as a pedestal for the pulses which pedestal increases in amplitude as the pulses diminish in amplitude due to delay-line attenuation, to thereby compensate the peak level of the output pulses at the delay line taps according to distance traveled in the delay line by the pulses.

Another difficulty is encountered in the type of presentation employed in the present system, the difficulty being caused by loading of the pulse circuits by the current through those conductor cross-points which have been illuminated during the earlier scanning of a now partially-scanned picture frame. Thus, the brighter the portion of the picture already scanned, the lower the pulse amplitude applied to the subsequent cross-points in the picture, and vice versa. In other words, the amount of pulse amplitude reduction due to this loading is proportional to the video modulation level.

It is another major object of this invention to compensate for the pulse loading and resulting amplitude reduction in proportion to the video modulation level. For this purpose, the present system employs a video integrator delivering an output voltage level which increases during each scanning of a frame, or complete picture, and then resets at the end of the frame. This output voltage is applied to either one of the coordinate conductor line structures to raise the pedestal voltage and/or the sub-threshold bias potential in proportion to the amount of illumination of the already-scanned portions of the frame.

Other objects and advantages will become apparent during the following discussion of the drawings, wherein:

FIG. 5 is a diagrammatic illustration of a modified form of the system shown in FIG. 4;

FIG. 6 is a diagrammatic illustration of a further modified form of the present invention especially suitable for radar plan-position indication;

FIG. 7 is a section view taken along line 7—7 of FIG. 6; and

FIG. 8 is a block diagram illustrating a form of the invention applicable to the system shown in FIG. 6 to continuously maintain a display on the matrix.

Figure 1:
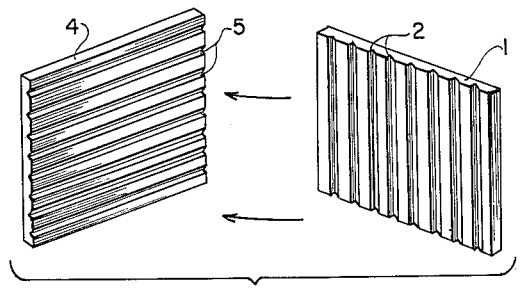
FIG. 1 is an exploded perspective view of the two plates forming a display matrix.
Figure 2:
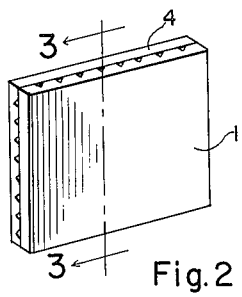
FIG. 2 is a perspective view showing the plate mutually joined in operative relation.
Figure 3:
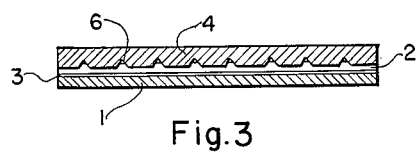
FIG. 3 is an enlarged sectional view taken along line 3—3 of FIG. 2.

The basic matrix is shown in FIGS. 2 and 3. A transparent plate 1 having a multiplicity of grooves 2 is mated with a similar plate 4 having grooves 5 running at a different angle. In FIG. 2 these two plates are shown assembled to form a matrix. A cross-section, shown in FIG. 3, reveals transparent conducting films 3 and 6 deposited in the bottoms of the grooves. The air in the grooves and between the plates is exhausted and replaced with an inert gas such as argon and the edges of the plates are then sealed. When a sufficient voltage is impressed between any two crossing conductors, the gas therebetween ionizes to cause a spot of light. Since each of the inert gases has a distinctive color, it is apparent that a number of matrix plate assemblies, each with a different gas, may be used to provide a multicolor display.

As stated above, it is an object of the invention to provide an improved system for pulsing the crossed conductors, which system is especially designed to make the sensitivity of the matrix more uniform so that the display provided thereby will vary according to the incoming signals, rather than according to the position of the signal being displayed on the matrix.

Figure 4:
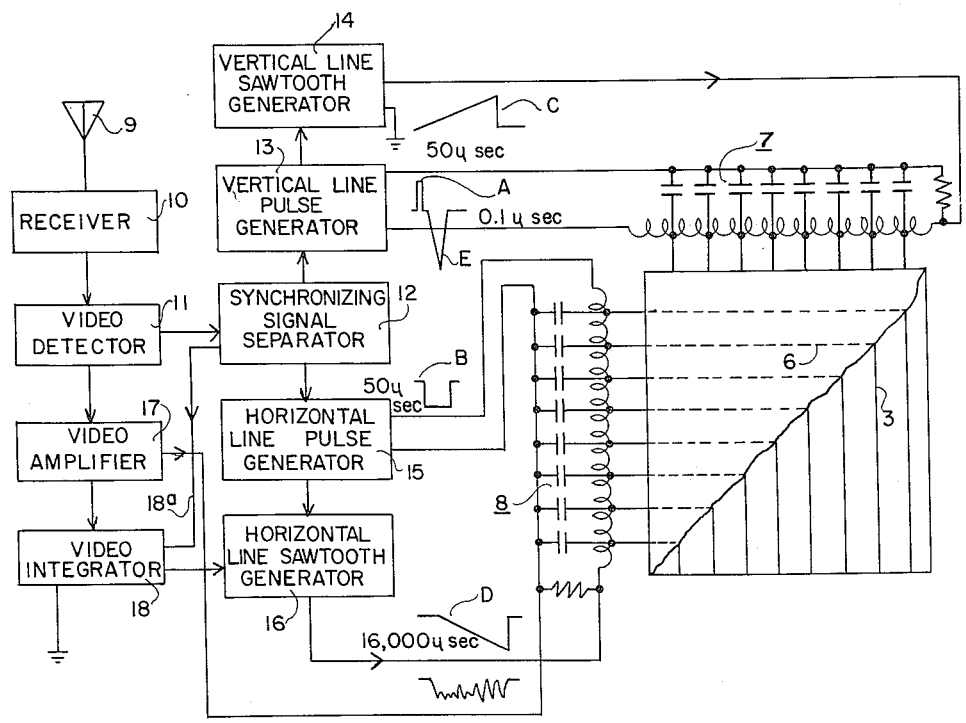
FIG. 4 is a diagrammatic illustration of a television system embodying the invention.

One practical embodiment of the improved system is shown in FIGURE 4, wherein a television signal picked up by an antenna 9 is amplified in a receiver 10 to provide a video signal at the output of a video detector 11. The system also includes a synchronizing signal separator 12 which at the beginning of a picture frame triggers both a vertical-line pulse generator 13 and a horizontal-line pulse generator 15. The former then initiates a short pulse that is applied to a delay line 7, the vertical conductors 3 of the display matrix being connected to equally spaced taps on the delay line. The pulse, therefore, appears in sequence on each of the vertical conductors 3.

However, the pulse is attenuated as it proceeds down the delay line 7, and it is an important feature of this system that means is provided to compensate for this attenuation so that the peak voltage on the last of the vertical conductors will remain the same as the peak pulse voltage on the first, or any other, of the vertical conductors. Therefore a vertical-line sawtooth generator 14, triggered by the vertical-line pulse generator 13, is employed to generate a sawtooth voltage C that is applied between the delay line 7 and a common reference point, i.e. ground. Thus the pulses A and the sawtooth C are combined to provide a composite constant peak-amplitude of voltage sweeping in succession each of the vertical conductors 3 of the matrix.

The synchronizing signal from the separator 12 also triggers a horizontal-line pulse generator 15. The latter provides a substantially longer pulse B than the vertical-line pulse generator 13 and applies it to another delay line 8. The ratio of pulse lengths from the generators 13 and 15 is such that the voltage on each horizontal line 6 is substantially maintained while a vertical pulse A is traveling through the entire delay line 7 and hence across all the vertical lines 3. Compensation for the inherent attenuation of the horizontal-line pulse in the delay line 8 is provided in the same manner as set forth above by a horizontal-line sawtooth generator 16 delivering a sawtooth D.

In a practical television display the duration of each positive pulse A from the vertical-line pulse generator 13 can be about .01 microsecond; each pulse B from the horizontal-line pulse generator 15 can be 50 microseconds and in this case the duration of each sawtooth C from the vertical-line sawtooth generator would also be 50 microseconds. The duration of the sawtooth D from the horizontal-line sawtooth generator 16 can be 16000 microseconds.

The video signal delivered by the video amplifier 17 is applied between the delay line 8 and a common reference point. Wherever the video signal causes an increase in the voltage between crossing matrix conductors above the ignition voltage of the gas a discharge results thereby illuminating a crossing point of the matrix.

However, the reselting discharge will tend to further reduce the amplitude of the pulses in the delay lines. In order to compensate such reductions, a video integrator 18 is employed to sum the video signals during each frame and deliver a voltage to the horizontal-line sawtooth generator 16 to continuously increase the voltage level of its sawtooth signal D accordingly. The video integrator 18 is reset to zero after each frame by a pulse through the line 18a. Therefore the output of the horizontal generator 16 is the composite of a sawtooth having a slope sufficient to compensate for the natural attenuation of the pulses B in the delay line 8 and an integrated video signal intended to compensate for the tendency of the matrix to bleed off the pulses in proportion to how much of the matrix is actually illuminated thereby.

Another modification of the system described in connection with FIG. 4 and providing a rectangular-coordinate television display appears in FIG. 5, units which are similar to those shown in FIG. 4 bearing similar reference characters. In this system the delay line for the horizontal conductors, however, has been replaced with an electronic commutator tube 40. An electron beam is directed down the length of the vacuum tube 40 along the envelop which has a row of plates 43, one plate for each horizontal line of the display. At the beginning of each picture frame, the synchronizing signal separator 72 triggers both a voltage sawtooth generator 41 and the current sawtooth generator 42. The output signals of these devices serve only to deflect the electron beam 40a so that it impinges in succession on each of the contact plates 43. It is especially important from the point of view of providing a practical unit having minimum dimensions that the envelop of the tube 40 be substantially coextensive with the side of the matrix and that the contact plates 43 be directly connected with the matrix conductors. Both electrostatic deflection by the voltage applied to the deflection plate 40b and electromagnetic deflection by the current applied to a magnetic yoke 40c are used in conjunction to more readily obtain the necessary amount of deflection without excessive voltage or current requirements and to provide the nonlinear sweep required in the commutator tube 40.

The matrix circuit connected between the vertical line pulse generator 13 and the horizontal line commutator tube 40 provides a voltage between the respective crossing conductors 3 and 6 almost sufficient to cause a discharge through the gas in the space between the conductors.

In this modification, the video signal from the television receiver, or other source, is connected to a grid 40d in the commutator tube and is of a positive polarity so that it increases the tube current. This in turn results in a larger voltage on the horizontal matrix conductor and thereby causes ionization to illuminate the cross points. A succession of such points forms a television picture.

The video integrator 18, serving the same purpose as it serves in FIG. 4, is connected, however, to the vertical-line sawtooth generator 14.

When it is desired to present a series of pictures as in television, it is necessary to periodically extinguish the display so that the next picture frame may be presented. In the system of FIG. 5 each horizontal line will remain illuminated only so long as the current from the commutator tube is maintained on that line and therefore the display is self-extinguishing.

However in FIG. 4, it is necessary to provide an additional means for extinguishing the cross points after they have been illuminated. This is accomplished by providing a high negative erase pulse E located just after the trailing edge of each vertical-line pulse A from the pulse generator 13. When it is desired to "freeze" a picture, it is simply necessary to eliminate the erase pulse E and blank out further video signals at the end of the frame. During ordinary display of television or other presentation, the erase pulse E follows the vertical pulse A by a fixed interval through the delay line 7. The interval between the pulses A and E determines how long the ionized cross points in each line of the matrix remain illuminated. In other words, the pulse A first passes through the delay line 7 making possible the illumination of cross point A, and then the negative erase pulse E follows through the delay line 7 and erases those points which were in fact illuminated. The pulse E can be generated by any conventional circuit forming a part of the vertical-line pulse generator 13, FIG. 4.

Although the descriptions of FIGS. 4 and 5 relate to a television system, it is obvious that the circuits can be adapted without basic modification to presentation of radar, sonar and other data.

Such a modification is shown in FIGS. 7 and 8, where the matrix 21 comprises a polar-coordinate arrangement including a plate 23 having radial azimuth lines 25 and a second plate 22 having concentric range circles 24 thereon. In this case only one delay line 27 is required because the speed of rotation of a radar antenna is low enough to permit the use of a mechanical commutator 29. The concentric rings 24 of the range conductors are connected successively at 26 to the taps of a delay line 27 which is driven by a pulse from the radar transmitter which triggers a synchronizing pulse generator 33 connected to the delay line 27. The delay line 27 is calculated such that a pulse is impressed on each ring at a time equivalent to the round-trip transit time of the radar signal for the range represented by that ring. In other words, if the last ring represents a range of 2000 yards, the synchronizing pulse in the delay line will reach the last ring at the same time that a radar signal returns to the receiver from a target 2000 yards distant. To compensate for the attenuation of the pulse in the delay line, a sawtooth voltage is applied to the delay line 27 by generator 34. By adjustment of the sawtooth amplitude, any reasonable attenuation in the delay line can be compensated. In addition, with the sawtooth it is possible to increase the sensitivity at the outside rings of the longer ranges by reducing the threshold voltage at the outer edges of the plate.

The video signal from the radar receiver is amplified in an amplifier 32, and applied to the radial conducting lines 25 through the contacts and wires 28 of the azimuth commutator 29. The proper contact 28 of the latter is selected by driving the commutator arm 29a in synchronism with the rotation of the antenna 30 driven by a drive 31 which is also coupled to the commutator arm 29a by a servo 35.

In FIG. 7 may be seen a cross-section of the polar display matrix 21. The transparent conductors 24 and 25 may be seen on the inner surfaces of transparent plates 22 and 23. To provide structural support spacers 20 are employed. This construction is alternative to the grooved plates previously described.

This transparent electronic display thus provides a multilayer glass plotting surface on which radar, sonar, and other signals automatically and continuously appear as luminous spots at the proper range and azimuth. Different range scales can be selected instantly by switching to a different delay line. A wide variety of colors is available so that different colors can be assigned to different but superimposed plots. For example, red can be used for air search targets, blue for surface search, green for sonar signals, and yellow for special symbols such as direction, altitude and speed.

Any one of three memory modes can be selected by the operator for any color or for all colors simultaneously. In normal operation, the signals are retained on the display for almost a full revolution of the sweep; just before the sweep returns with new position data, the old signals are extinguished. When desired, a permanent memory feature may be utilized. In this case, all signals remain on the display until erased. Thus all ship maneuvers, aircraft approaches, and so forth appear as lines instead of points and in the appropriate color. As a third mode, a more complex erase function can be devised to blank out selected areas at any desired range and azimuth angle.

The voltages required to initiate and to maintain the glow are dependent on the separation between conductors and the gas pressure. For the purpose of discussion, however, it will be assumed that ignition requires a minimum of 90 volts, while at least 60 volts is required to maintain the glow. In the system of FIG. 5, these voltages are obtained from three sources. First, a 65 volt D.C. hold potential is applied by a source 36 across all the tube intersections at all times (except when erasing) for operation of the memory function. As shown in FIG. 8, the video signal from amplifier 32, with a threshold level of 10 volts, is connected to the radial conductors through the azimuth commutator 29. A 20 volt pulse is initiated by the transmitter trigger synchronizing pulse generator 33 and is applied to the concentric range rings through the multiple tap delay line 27. Thus, when the antenna is directed along a given azimuth, a target 10 miles away will return a video signal at the instant when the range pulse is at the delay line tap connected to the 10-mile range ring. Because the video signals, the synchronizing range pulse, and the D.C. holding voltage are all applied in a series circuit the 90-volt ignition level is exceeded and a glow is initiated. The holding voltage then maintains the glow. When permanent memory tracking is not in use, the holding circuit for each azimuth radial line is broken by the commutator just before each antenna sweep. Consequently, each target is retained only until a new sweep arrives. With the permanent memory connection, of course, the holding circuit is maintained continuously and the illuminating effects on successive sweeps are cumulative.

The resolution provided by the display is dependent on the number of cross points of the conductors. Range resolution is also dependent on the range scale selected. If a sixty-inch summary plot is taken as an example, the thirty-inch radius might correspond to 100,000 yards. Then with 20 range lines per inch, the distance between lines is equivalent to 167 yards or 0.16% of the total range. For the surface search display, the number of lines per inch can be increased to provide improved resolution at ranges out to five miles, for example.

The spacing of the radial lines determines the azimuth resolution. At the outer edges, 1,440 lines can easily be provided for a resolution of ¼ degree. As the lines converge toward the center, however, it will be necessary to reduce the number because of the smaller area available. This can be done by allowing alternate lines to stop at the 20% range line, of those remaining another half stop at 10% range, and so forth. Since a target at close range covers a wider azimuth angle than would the same target at a longer range, no loss of targets is anticipated.

This invention is not to be limited to the exact forms shown in the drawings for obviously changes may be made within the scope of the following claims.

We claim:
1. An electronic system for displaying a pattern of illuminated spots on a gas filled matrix having series of mutually crossed coordinate conductors in response to groups of input video signals separated by synchronizing pulses, the signals being connected to said crossed conductors, said system comprising separate commutating means each connected with one of said series of crossed conductors and sequentially applying to the conductors in each series bias voltages having amplitudes less than the threshold voltage necessary to ionize the gas between crossed conductors, at least one of said commutating means comprising a bias pulse generator synchronized to said synchronizing pulses, a bias-pulse delay line coupled with said pulse generator and having taps connected with the associated series of conductors and sequentially applying the bias pulse thereto; and compensating means generating a continuously increasing compensating voltage between synchronizing pulses and applying said compensating voltage between the conductors of the crossed series to compensate for pulse amplitude decreases as each pulse passed along the delay line.

2. In a system as set forth in claim 1, said compensating means comprising a sawtooth wave generating means connected with each bias pulse generator and triggered thereby to deliver a sawtooth wave of duration equal to the time required for the bias pulse to pass through the associated delay line, the sawtooth wave being connected with the delay line and increasing the potential thereof with time to compensate for the attenuation of each bias pulse passing therethrough.

3. In a system as set forth in claim 1, said compensating means comprising a video signal integrator connected to receive said input signals and connected to apply an integrated potential between the series of crossed conductors to raise the potential difference therebetween in proportion to the integrated video signal and therefore in proportion to the number of conductor cross points already ionized; and integrator reset means connected with said synchronizing pulses to reset the integrated potential to zero when each matrix pattern has been displayed.

4. In a system as set forth in claim 1, said matrix comprising two substantially transparent plates and having a series of grooves recessed in one face and said faces of the plates being abutted with the grooves in the opposed faces disposed in mutually crossing relation, said grooves being filled with a gas and the plates sealed together; and said conductors comprising substantially transparent conductive coatings in the bottoms of the grooves.

5. An electronic system for displaying a pattern of illuminated spots on a gas filled matrix having series of mutually crossed coordinate conductors in response to groups of input video signals separated by synchronizing pulses, the signals being connected to said crossed conductors, said system comprising separate commutating means each connected with one of said series of crossed conductors and sequentially applying to the conductors in each series bias voltages having amplitudes less than the threshold voltage necessary to ionize the gas between crossed conductors, at least one of said commutating means comprising a bias pulse generator, a delay line periodically pulsed thereby and having a plurality of taps each connected with one of the conductors of an associated series, said pulse generator being triggered by said synchronizing pulses; and sawtooth wave generating means connected with each pulse generator and triggered thereby to deliver a sawtooth wave of duration equal to the time required for a bias pulse to pass through the associated delay line, the sawtooth wave being connected with the delay line and increasing the potential thereof with time to compensate for the attenuation of each bias pulse passing therethrough.

6. In a system as set forth in claim 5, a video signal integrator connected to receive said input signals and connected to apply an integrated potential between the series of crossed conductors to raise the potential difference therebetween in proportion to the integrated video signal and therefore in proportion to the number of conductor cross points already ionized; and integrator reset means connected with said synchronizing pulses to reset the integrated potential to zero when each matrix pattern has been displayed.

7. In a system as set forth in claim 5, one other of said commutating means comprising a narrow evacuated envelop substantially coextensive with one side of the matrix; electron beam generating means in said envelop and including a beam-intensity control electrode; a row of contact plates each connected with a conductor of the associated series and said row being disposed along one side of the envelop parallel with the side of the matrix and with said beam; deflection means adjacent said beam for deflecting said beam to successively impinge upon each of said contact plates; deflection generator means connected with said deflection means; and said input video signals being connected to said intensity control electrode.

8. In a system as set forth in claim 7, said deflection means comprising the combination of both electrostatic and magnetic deflection adjustable to precisely position the beam on the successive contact plates.

9. In a system as set forth in claim 5, for use with television apparatus having line synchronizing pulses and frame synchronizing pulses, two commutating means each including a bias pulse generator synchronized with a different one of said synchronizing pulses and each commutating means further including a delay line coupled with the bias pulse generator and having taps connected with the conductors of the associated series, and one of said sawtooth wave compensating means associated with each of said commutating means.

10. In a system as set forth in claim 9, a video signal integrator connected to receive said input signals and connected to apply an integrated potential between the series of crossed conductors to raise the potential difference therebetween in proportion to the integrated video signal and therefore in proportion to the number of conductor cross points already ionized; and integrator reset means connected with said synchronizing pulses to reset the integrated potential to zero when each matrix pattern has been displayed.

11. In a system as set forth in claim 5, for use in pulsed radar apparatus including a receiver and a rotating antenna, said crossed conductor series comprising a system of polar coordinates, another of said commutating means comprising a multiple-contact rotary switch coupled for unitary rotation with the antenna and having each of its contacts connected with a radially disposed conductor, the switch being connected with said video signals and distributing the latter successively to the radial conductors, and said one commutating means being connected to successive annular ring conductors of the polar-coordinate system, and the latter commutating means being synchronized with the radar pulse repetition rate.

12. In a system as set forth in claim 11, a source of direct current having a voltage exceeding the potential required to maintain ionization in the matrix but less than the potential required to establish ionization; means connecting said source with all the conductors in the respective crossed series, to combine with the voltage of the bias pulses and the compensating potential to bring the composite potential between crossed conductors to a level just below that required to initially establish ionization, whereby the additional potential contributed by input video signals can selectively establish ionization.

13. An electronic system for displaying a pattern of illuminated spots on a gas filled matrix having series of mutually crossed coordinate conductors in response to groups of input video signals separated by synchronizing pulses, the signals being connected to said crossed conductors, said system comprising separate commutating means each connected with one of said series of crossed conductors and sequentially applying to the conductors in each series bias voltages having amplitudes less than the threshold voltage necessary to ionize the gas between crossed conductors, at least one of said commutating means comprising a bias pulse generator synchronized to said synchronizing pulses, bias pulse distribution means coupled with said pulse generator and with the associated series of conductors and sequentially applying the bias pulses thereto; a video signal integrator connected to receive said input signals and applying an integrated potential between the series of crossed conductors; and reset means connected with said synchronizing pulses to reset the integrated potential to zero when each matrix pattern has been displayed.

14. In a system as set forth in claim 13, one other of said commutating means comprising a narrow evacuated envelop substantially coextensive with one side of the matrix; electron beam generating means in said envelop and including a beam-intensity control electrode; a row of contact plates each connected with a conductor of the associated series and said row being disposed along one side of the envelop parallel with the side of the matrix and with said beam; deflection means adjacent said beam for deflecting said beam to successively impinge upon each of said contact plates; deflection generator means connected with said deflection means; and said input video signals being connected to said intensity control electrode.

15. In a system as set forth in claim 14, said deflection means comprising the combination of both electrostatic and magnetic deflection adjustable to precisely position the beam on the successive contact plates.

16. In a system as set forth in claim 13, for use with television apparatus having line synchronizing pulses and frame synchronizing pulses, two commutator means each including a bias pulse generator synchronized with a different one of said synchronizing pulses and each commutating means further including a delay line coupled with the bias pulse generator and having taps connected with the conductors of the associated series.

17. In a system as set forth in claim 13, for use in pulsed radar apparatus including a receiver and a rotating antenna, said crossed conductor series comprising a system of polar coordinates, another of said commutating means comprising a multiple-contact rotary switch coupled for unitary rotation with the antenna and having each of its contacts connected with a radially disposed conductor, the switch being connected with said video signals and distributing the latter successively to the radial conductors, and said one commutating means being connected to successive annular ring conductors of the polar-coordinate system, and the latter commutating means being synchronized with the radar pulse repetition rate.

18. In a system as set forth in claim 17, a source of direct current having a voltage exceeding the potential required to maintain ionization in the matrix but less than the potential required to establish ionization; means connecting said source with all the conductors in the respective crossed series, to combine with the voltage of the bias pulses and the compensating potential to bring the composite potential between crossed conductors to a level just below that required to initially establish ionization, whereby the additional potential contributed by input video signals can selectively establish ionization.

References Cited in the file of this patent
UNITED STATES PATENTS
2,955,284    Thorsen _____ Oct. 4, 1960